(12) United States Patent
Blair

(10) Patent No.: US 9,521,098 B2
(45) Date of Patent: Dec. 13, 2016

(54) METHOD AND SYSTEM FOR THE PROMOTING AND PROVIDING OF PERSONAL SAFETY USING A PERSONAL SAFETY NETWORK

(71) Applicant: Alan Randall Blair, Austin, TX (US)

(72) Inventor: Alan Randall Blair, Austin, TX (US)

( * ) Notice: Subject to any disclaimer, the term of this patent is extended or adjusted under 35 U.S.C. 154(b) by 0 days.

(21) Appl. No.: 14/686,491

(22) Filed: Apr. 14, 2015

(65) Prior Publication Data
US 2015/0222579 A1    Aug. 6, 2015

Related U.S. Application Data

(63) Continuation-in-part of application No. 13/506,863, filed on May 21, 2012, now abandoned.

(51) Int. Cl.
| | |
|---|---|
| *G08B 21/00* | (2006.01) |
| *H04L 12/58* | (2006.01) |
| *H04L 29/08* | (2006.01) |
| *H04W 4/02* | (2009.01) |
| *H04W 4/22* | (2009.01) |

(52) U.S. Cl.
CPC ............ *H04L 51/046* (2013.01); *H04L 51/28* (2013.01); *H04L 67/18* (2013.01); *H04W 4/02* (2013.01); *H04W 4/22* (2013.01)

(58) Field of Classification Search
CPC ........................ G06Q 30/0631; G06Q 30/0271
USPC ........................................................ 340/669
See application file for complete search history.

(56) References Cited

U.S. PATENT DOCUMENTS

| | | | | |
|---|---|---|---|---|
| 2010/0295656 A1* | 11/2010 | Herickhoff | .............. | H04L 63/08 340/3.1 |
| 2011/0319051 A1* | 12/2011 | Reitnour | ................. | G01S 19/17 455/404.2 |
| 2012/0164997 A1* | 6/2012 | Iyer | ...................... | G06Q 10/109 455/414.2 |

* cited by examiner

*Primary Examiner* — Kerri McNally
(74) *Attorney, Agent, or Firm* — Hulsey, P.C.

(57) ABSTRACT

Embodiments provide a system and method for providing personal safety for a user.

10 Claims, 9 Drawing Sheets

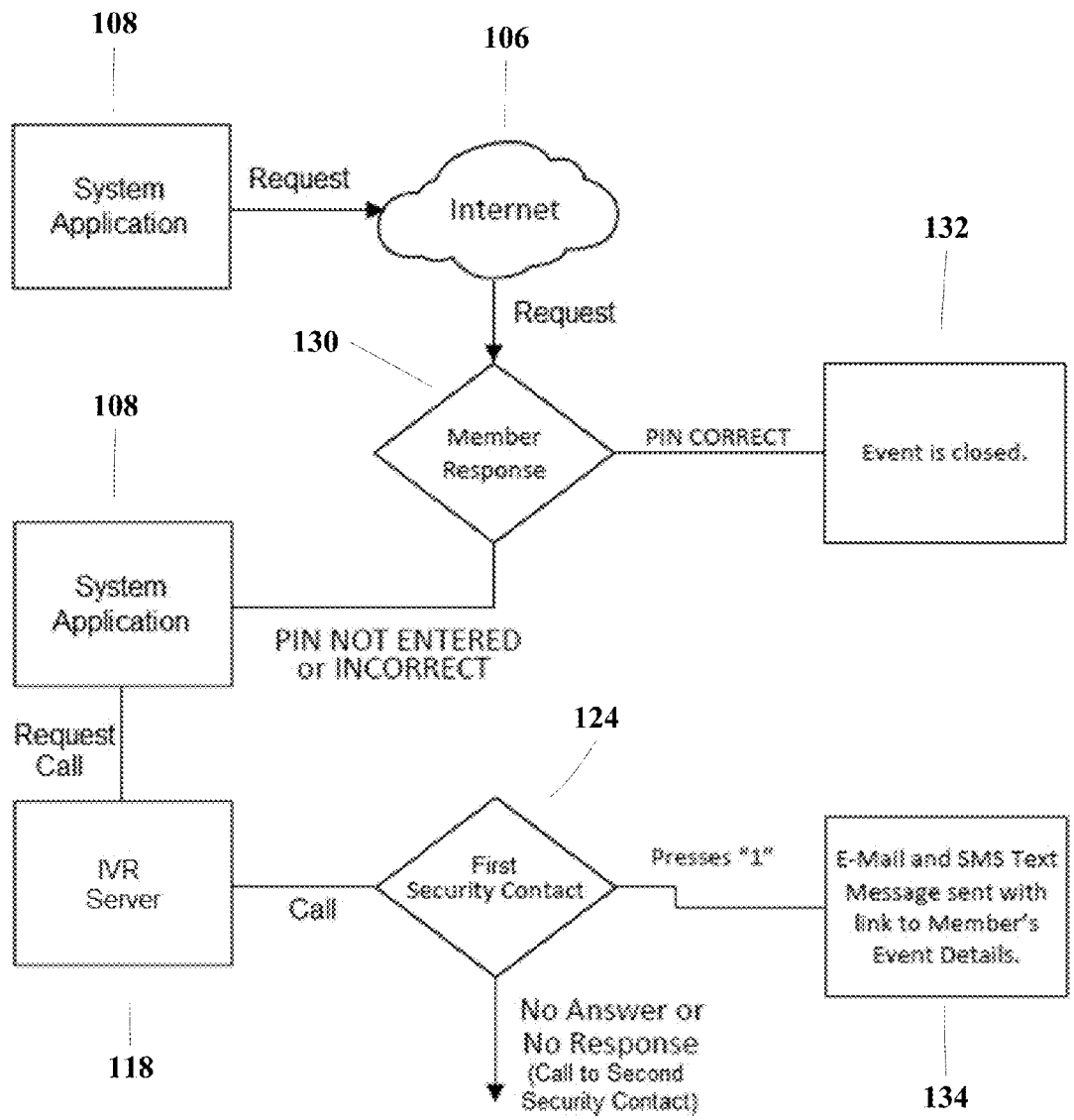
FIG. 2.1

METHOD AND SYSTEM FOR THE PROMOTING AND PROVIDING OF PERSONAL SAFETY USING A PERSONAL SAFETY NETWORK

CROSS-REFERENCE TO RELATED APPLICATIONS

This application claims priority to U.S. Non-Provisional patent application Ser. No. 13/506,863, filed May 21, 2012, which is hereby incorporated by reference in its entirety as if set forth in full herein.

FIELD OF THE INVENTION

The present disclosure relates to a method and system for the promoting and providing of personal safety using a personal safety network. Embodiments also relate to a method and system utilizing electronic devices to promote and provide personal safety efficiently.

BACKGROUND OF THE INVENTION

The disclosed subject matter provides a method and system for the promoting and providing of personal safety using a personal safety network. The system may utilize electronic devices, such as a cellular phone, or a similar electronic device to promote and provide personal safety efficiently.

BRIEF SUMMARY OF THE INVENTION

The disclosed subject matter provides a method and system for the promoting and providing of personal safety using a personal safety network. The system may utilize electronic devices, such as a cellular phone, or a similar electronic device to promote and provide personal safety efficiently.

The disclosure provides a method for providing personal safety to a user. In embodiments, the method comprises receiving, at a network interface, information for contacts from a computing device, wherein the computing device is connected to the network interface over a network.

The network interface may receive information regarding the event from the computing device. The network interface may further receive a notification that at least one specified condition has not been met for the notification to have been sent to the network interface. The network interface may further receive event completion data pertinent to the event.

The received notification is then processed using a processor. Once the notification that states that specific conditions have not been met is processed, the computing system may determine a contact of the user to contact. The contact may then be sent a notification concerning the user.

In embodiments, the at least one specified condition may be a task such as, but not limited to, inputting a password, triple clicking a home button on a computing device, double clicking a home button on a computing device, The disclosure may further provide a system for providing personal safety to a user. In embodiments, the system may comprise a network interface for receiving information for contacts from a computing device connected to the network interface over a network.

The disclosure may further provide a network interface for receiving information regarding the event from a computing device connected to the network interface over a network, a network interface for receiving a notification that at least one specified condition has not been met for the notification to have been sent to the network interface from a computing device connected to the network interface over a network, and a network interface for receiving event completion data from a computing device connected to the network interface over a network.

A memory may be provided that may store the contact information, event information, the notification, and the event completion data. A processor may process the received notification using a processor to determine a contact of the user to contact. The memory may be controlled by the processor to contact at least one contact of the user.

In embodiments, an electronic device may be utilized to provide safety precautions to a user when the user is in a situation that may need precautions.

BRIEF DESCRIPTION OF THE DRAWINGS

The novel features believed characteristic of the disclosed subject matter will be set forth in any claims that are filed. The disclosed subject matter itself, however, as well as a preferred mode of use, further objectives, and advantages thereof, will best be understood by reference to the following detailed description of an illustrative embodiment when read in conjunction with the accompanying drawings, wherein:

FIG. 2.1 displays a data flow diagram for contacting user contacts according to an embodiment.

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although described with reference to personal computers and the Internet, one skilled in the art could apply the principles discussed herein to any computing or mobile computing environment. Further, one skilled in the art could apply the principles discussed herein to communication mediums beyond the Internet.

Figure 1:
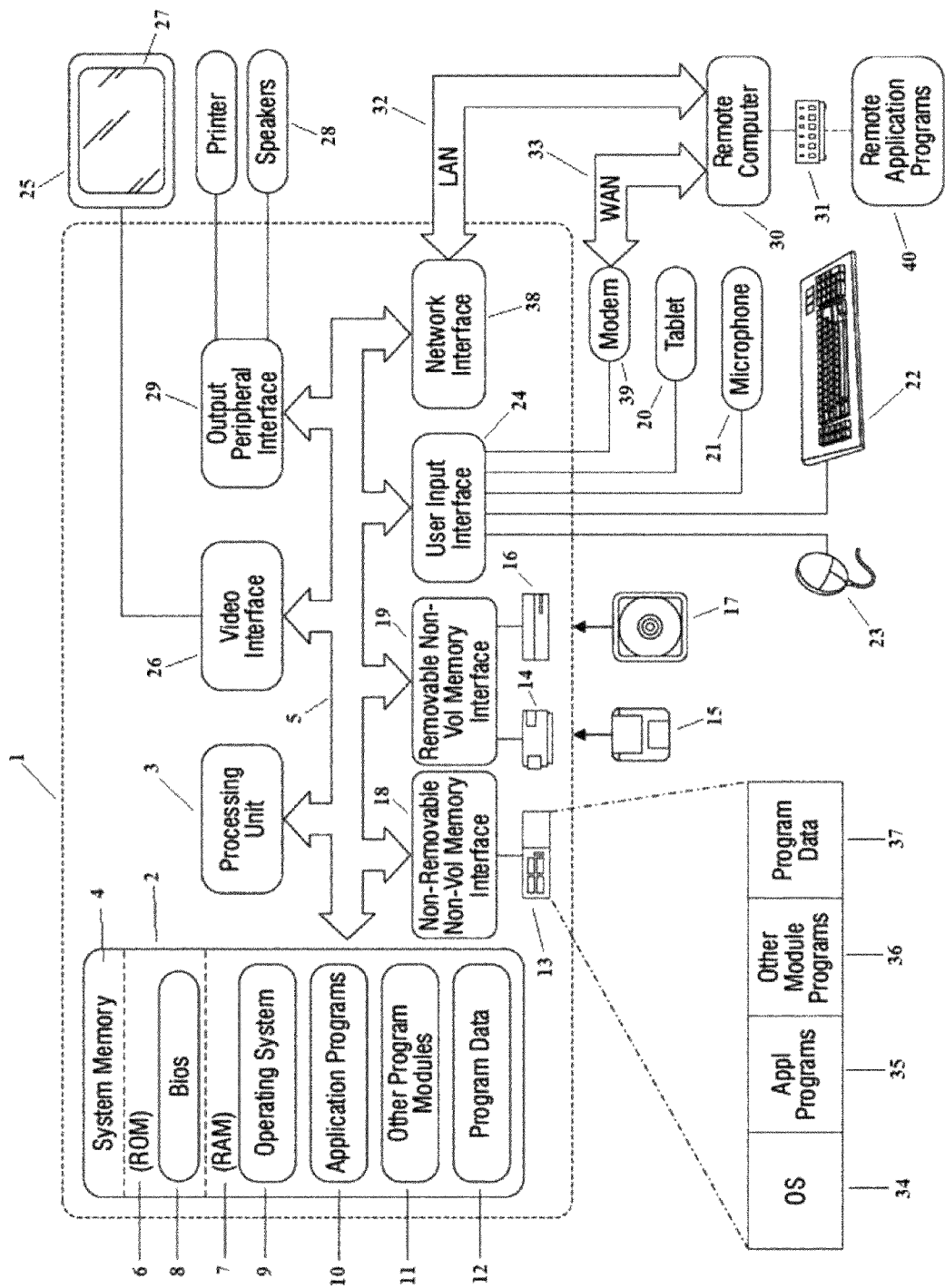
FIG. 1 displays an embodiment of a computing system and related peripherals that may operate with the method and system for the promoting and providing of personal safety using a personal safety network.

FIG. 1 displays one embodiment of a computing system 1 and related peripherals that may operate with the method and system for the promoting and providing of personal safety using a personal safety network.

With reference to FIG. 1, an exemplary system within a computing environment for implementing the disclosure includes a general purpose computing device in the form of a computing system 1, commercially available from Intel, IBM, AMD, Motorola, Cyrix, etc. Components of the computing system 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, or a local bus using any of a variety of bus architectures.

Computing system 1 typically includes a variety of computer readable media. Computer readable media can be any available media that can be accessed by the computing system 1 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 1.

The system memory 4 includes computer storage media in the form of volatile and/or nonvolatile memory such as read only memory (ROM) 6 and random access memory (RAM) 7. A basic input/output system 8 (BIOS), containing the basic routines that help to transfer information between elements within computing system 1, such as during start-up, is typically stored in ROM 6. RAM 7 typically contains data and/or program modules that are immediately accessible to and/or presently being operated on by processing unit 3. By way of example, and not limitation, an operating system 9, application programs 10, other program modules 11 and program data 12 are shown.

Computing system 1 may also include other removable/non-removable, volatile/nonvolatile computer storage media. By way of example only, a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through a non-removable memory interface such as interface 18, and magnetic disk drive 14 and optical disk drive 16 are typically connected to the system bus 5 by a removable memory interface, such as interface 19.

The drives and their associated computer storage media, discussed above, provide storage of computer readable instructions, data structures, program modules and other data for the computing system 1. For example, hard disk drive 13 is illustrated as storing operating system 34, application programs 35, other program modules 36 and program data 37. Note that these components can either be the same as or different from operating system 9, application programs 10, other program modules 11, and program data 12. Operating system 34, application programs 35, other program modules 36, and program data 37 are given different numbers here to illustrate that, at a minimum, they are different copies.

A user may enter commands and information into the computing system 1 through input devices such as a tablet, or electronic digitizer, 20, a microphone 21, a keyboard 22, and pointing device 23, commonly referred to as a mouse, trackball, or touch pad. These and other input devices are often connected to the processing unit 3 through a user input interface 24 that is coupled to the system bus 5, but may be connected by other interface and bus structures, such as a parallel port, game port or a universal serial bus (USB).

A monitor 25 or other type of display device is also connected to the system bus 5 via an interface, such as a video interface 26. The monitor 25 may also be integrated with a touch-screen panel or the like. Note that the monitor and/or touch screen panel can be physically coupled to a housing in which the computing system 1 is incorporated, such as in a tablet-type personal computer. In addition, computers such as the computing system 1 may also include other peripheral output devices such as speakers 27 and printer 43, which may be connected through an output peripheral interface 29 or the like.

Computing system 1 may operate in a networked environment using logical connections to one or more remote computers, such as a remote computing system 30. The remote computing system 30 may be a personal computer (including, but not limited to, mobile electronic devices), a server, a router, a network PC, a peer device or other common network node, and typically includes many or all of the elements described above relative to the computing system 1, although only a memory storage device 31 has been illustrated. The logical connections depicted include a local area network (LAN) 32 connecting through network interface 38 and a wide area network (WAN) 33 connecting via modem 39, but may also include other networks. Such networking environments are commonplace in offices, enterprise-wide computer networks, intranets and the Internet.

For example, in the present embodiment, the computer system 1 may comprise the source machine from which data is being generated/transmitted and the remote computing system 30 may comprise the destination machine. Note however that source and destination machines need not be connected by a network or any other means, but instead, data may be transferred via any media capable of being written by the source platform and read by the destination platform or platforms.

In another example, in the present embodiment, the remote computing system 30 may comprise the source machine from which data is being generated/transmitted and the computer system 1 may comprise the destination machine.

In a further embodiment, in the present disclosure, the computing system 1 may comprise both a source machine from which data is being generated/transmitted and a destination machine and the remote computing system 30 may also comprise both a source machine from which data is being generated/transmitted and a destination machine.

For the purposes of this disclosure, it is appreciated that the terms "device", "processor based mobile device", "mobile device", "electronic device", "processor based mobile electronic device", "mobile electronic device", "computing device", and "location-capable wireless device" may be synonymous with remote computer 30.

The central processor operating pursuant to operating system software such as IBM OS/2®, Linux®, UNIX®, Microsoft Windows®, Apple Mac OSX® and other commercially available operating systems provides functionality for the services provided by the present disclosure. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

The computing system may run software or any application programs relative to the personal safety network. In embodiments, an electronic device may run one or more applications relative to the personal safety network.

It is noted that any server described herein may be incorporated within the structure of the computing system 1 or may be connected to the computing system 1 via a link.

Figure 2:
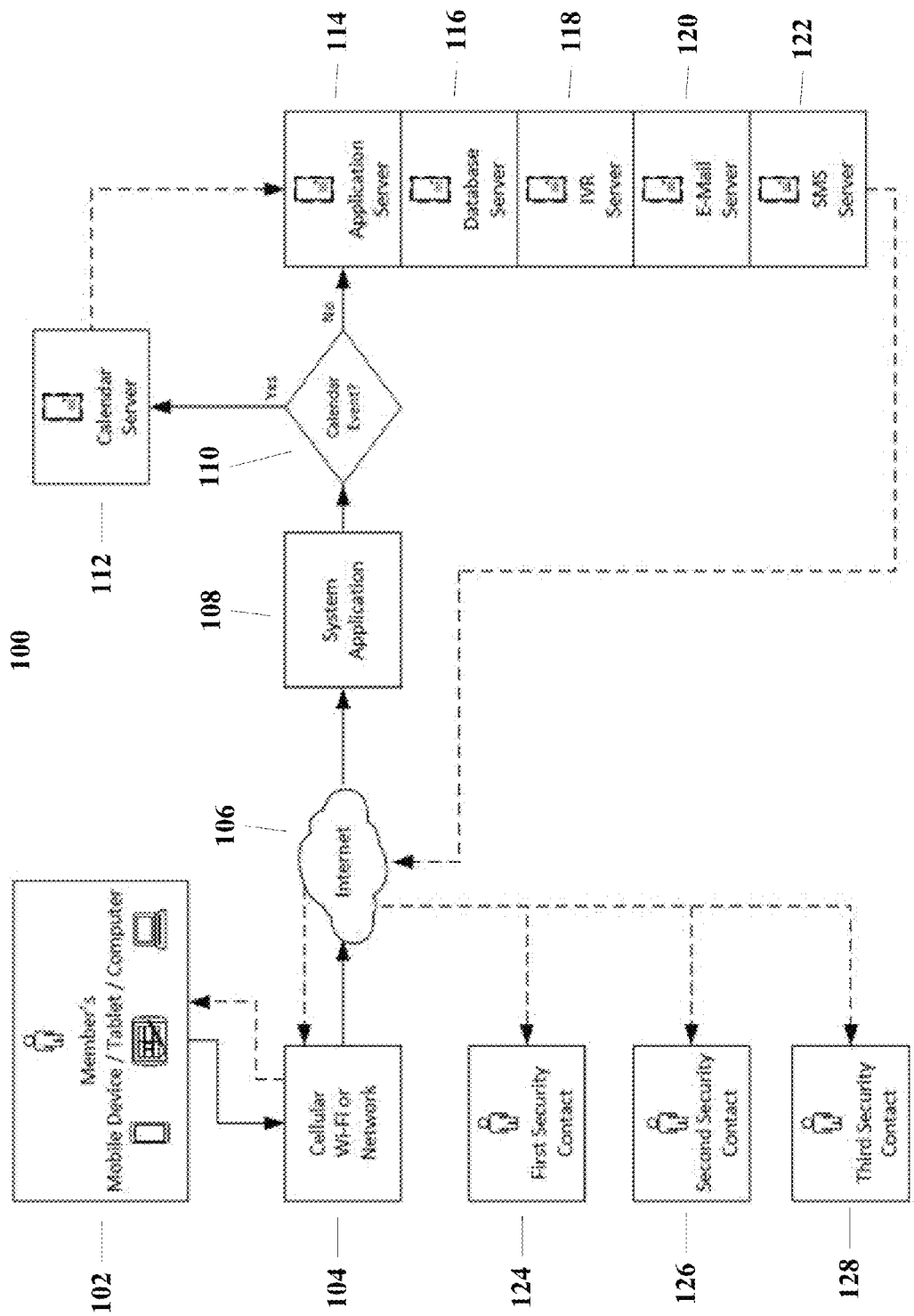
FIG. 2 displays an embodiment of a personal safety network.

FIG. 2 displays an embodiment of the personal safety network 100. A user may utilize an electronic device 102, such as, but not limited to a mobile device, tablet, and computer (such as computing system 1), in order to access and make use of the personal safety network 100. The personal safety network 100 may provide tracking of a user as well as storage for a user to document information relative to the user. The electronic device 102 may include one or more of the elements found in the computing system 1 disclosed above. The electronic device 102 may access the internet using a cellular network, a Wi-Fi network, or other type of network 104. Once connected to the internet 106, the user may access a system application 108 found on the electronic device 102. The system application 108 may utilize a system memory 4 in order to allow a user to save a calendar event 110. A calendar event 110 may be an event in which a user may have the potential of attending at a future point in time. If a user does create a calendar event on their electronic device 102, details concerning the event 110 may be sent directly to a calendar server 112 as the details are being input into the electronic device 102. The calendar server 112 may then access other servers such as, but not limited to, an application server 114, database server 116, IVR server 118, E-mail server 120, and/or SMS server 122. These servers may accept information from the electronic device 102 in the form of commands. The servers may supply information to security contacts of a user by way of the internet. In embodiments, a server may contact and supply information to a first security contact 124. In embodiments, if a first security contact 124 is unable to be contacted at a certain point in time, a second security contact 126 may be contacted and supplied information. In embodiments, if a first security contact 124 and a second security contact 126 are unable to be contacted at a certain point in time, a third security contact 128 may be contacted and supplied information. In embodiments, a server may attempt to contact security contacts until a security contact is able to be contacted and supplied information. For the purposes of this disclosure, the terms "event" and "calendar event" may be synonymous.

FIG. 2.1 displays an embodiment of a data flow diagram for contacting user contacts. For the purposes of this disclosure, the term "event" may be a task that a user may physically perform. When an event 110 is logged in the system application 108 by a user, the system application 108 may automatically or the user may manually set a time at which the user may be alerted by the system application 108 as well as an amount of time that the user has to respond to the alert. The alert, or request, may serve as a "check-up" to make sure that a user is in a desirable situation before, during, or after an event 110. Using a connection to the internet 106, the system application 108 may send the request to the user. The member may respond 130 by performing a function on their electronic device 102, such as entering a pin number on their electronic device 102. Other functions that the user may perform may include, but are not limited to: inputting a password, triple clicking a home button on a computing device, double clicking a home button on a computing device, etc. This performing of a function may also be referred to as "satisfying a condition" collectively set by the user electronic device 102 in conjunction with the system application 108, the calendar server 112, and the application server 114. If the user performs the function in the amount of time allotted, the event 110 may be closed 132, meaning that security contacts of the user will not be contacted by the personal safety network 100. If the user does not perform the function in the amount of time allotted, the system application 108 may send a request for a call using the internet 106 and an IVR server 118 to send an automated call to an electronic device 102 of a user's first security contact 124. In this case, it may be inferred that the user was not able to perform the function due to the fact that the user may be unable to perform the function against their will or the user may have purposefully performed the function wrong or not performed the function if the user knew that they were in an undesirable situation.

The automated call may provide general information concerning the user. If the first security contact 124 performs a function during the call such as, but not limited to, pressing the number "1" on their electronic device 102, a command may be sent 134 to the email server 120 and/or SMS server 122 associated with the system application 108 and personal safety network 100. The email server 120 and/or SMS server 122 may then send the first security contact 124 an email and/or an SMS text message to the first security contact's electronic device with links to a user's event details. If the first security contact 124 does not answer the call from the IVR server 118, the IVR server 118, in response, may send an automated call to a second security contact 126 of the user. A similar or the same process may be carried out with second, third, fourth, etc. security contacts as the process carried out with the first security contact 124. Essentially, the security contacts of the user may be contacted one after the other until one of the security contacts answers the call from the IVR server 118.

For the purposes of this disclosure, it is noted that the application server 114 may be programmed to send protocol via a wireless or wired network (such as, but not limited to a cellular network, a Wi-Fi network, or other type of network 104) to a user electronic device 102 in response to a calendar server 112 command. The command may be in response to an event alert. The alert may include, but is not limited to a scheduled event alert. The protocol sent by the application server 114 to the user electronic device 102 may include commands that may require a user to fulfill one or more conditions. Based on the fulfillment of the conditions or the unfulfillment of the conditions, certain protocol may be sent from the user electronic device 102 and back to the application server 114. If the user does fulfill the one or more conditions, the application server 114 may receive protocol stating that conditions have been met and no further action is necessary concerning the specific event alert. If the user does not fulfill the one or more conditions, the application server 114 may receive protocol to command the IVR server 118 and/or email server 120 to send notifications to contacts of the user.

In embodiments, the system application 108 or the user may set up more than one alert time for one or more scheduled alerts.

Figure 3:
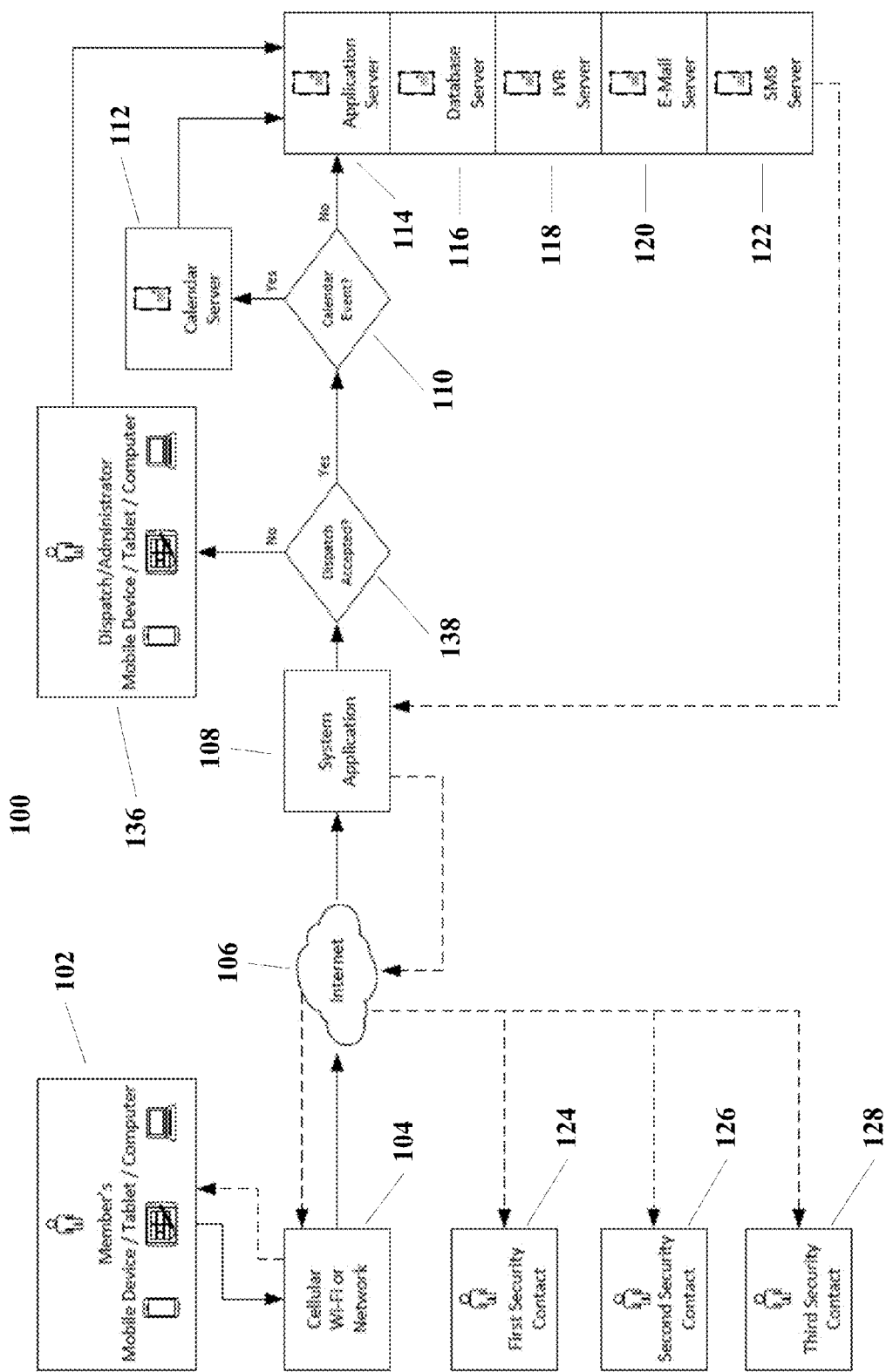
FIG. 3 displays an embodiment of a personal safety network with a dispatch/administrator.

FIG. 3 displays an embodiment of a personal safety network 100 with a dispatch/administrator 136. This setup is similar to the setup found in FIG. 2 but includes dispatch/administrator involvement. The dispatch/administrator 136 may alternatively receive information relative to a calendar event 110 (alternatively referred to as a dispatch) when information is not accepted by the calendar server 112. The dispatch/administrator 136 may accept 138 and forward the information to the necessary servers.

Figure 4:
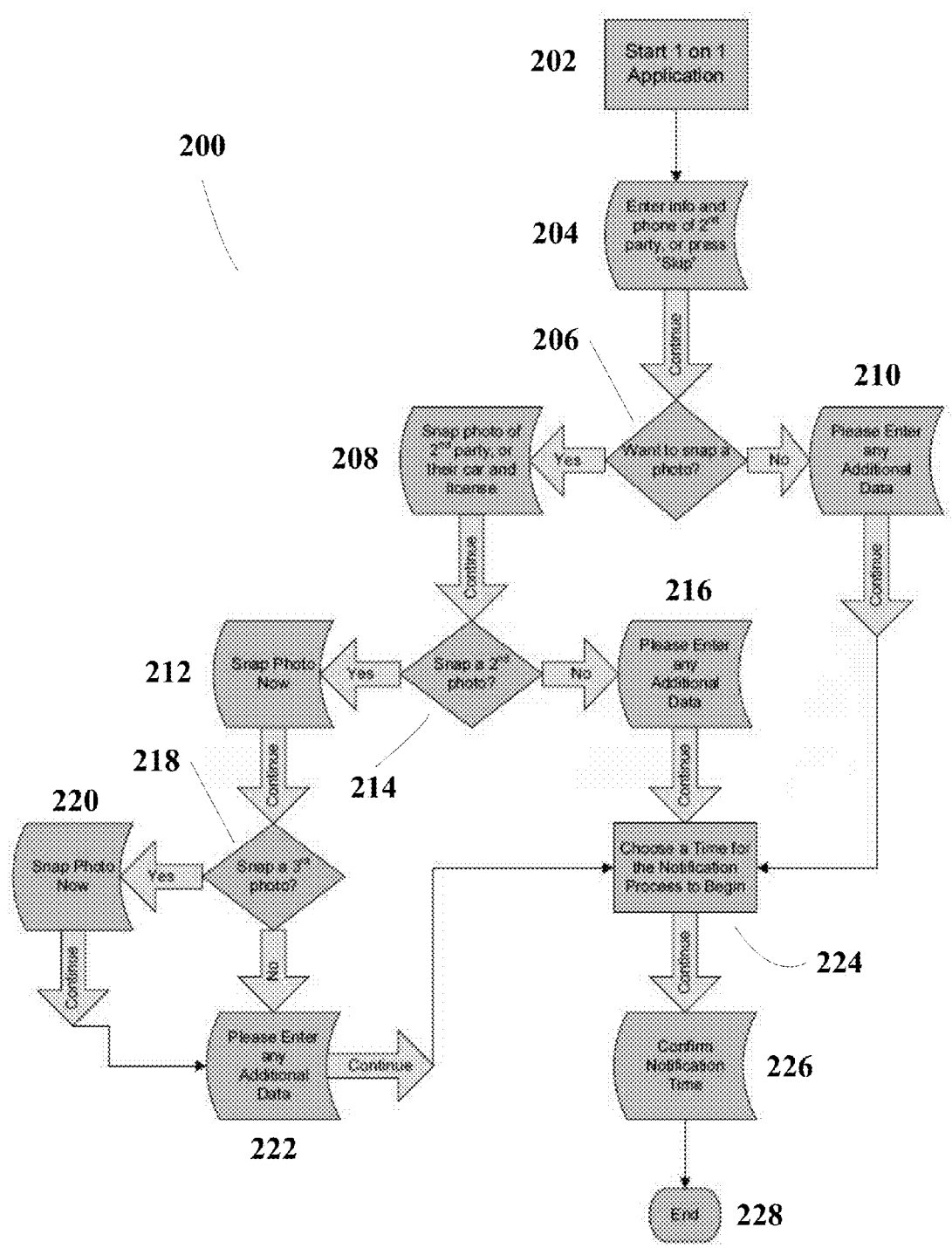
FIG. 4 displays a flow diagram for a potential series of steps/events for a one-on-one user event according to an embodiment.

FIG. 4 displays a flow diagram for a potential series of steps/events for a one-on-one user event 200 according to an embodiment. The flow diagram may illustrate one embodiment of a method that may utilize the computing system 1 in conjunction with a user electronic device 102. A user may first have an electronic device 102 run or start 202 the "1 on 1" application. This application may be activated from a home screen of an electronic device 102 or within an application on an electronic device 102. The activation may be carried out by a user actuating an icon representative of a "1 on 1" application. The user may then be led to a screen that may allow the user to enter information 204 for an event and/or one or more parties that the user may potentially encounter at a later point in time (during the event). The information may include details such as, but not limited to event name, event location, event purpose, beginning time of the event, length of the event, ending time of the event, name(s) of other event parties, and phone numbers of other event parties. Once the information is input, the user may be led to a screen that may ask the user whether they would like to take a photograph 206 using a camera on the electronic device 102.

The user may take photographs relative to the event that may occur in the future 208. For instance, a user may take photographs of a second party, a second party's car, and/or a second party's license. If the user takes a photograph, the user may be led to a screen asking the user to input any additional information relative to the photographs 208. If the user does not need to enter any information, the user may actuate a "done" or "continue" icon to be led to the next screen. If the user did not need to snap any photographs 206, the user may be led to a screen where the user can enter any additional data 210. Once additional data is or is not put in, the user may be led to a screen that lets the user choose a time for a notification process to begin 224 (see description below). The user may then be asked a second and third time if the user would like to snap a photograph 214, 218. After being asked to take a second photograph, the user may be led to a screen to snap a photo 212. If the user chooses not to snap a second photograph, the user may be led to a screen that may ask the user to enter any additional data 216. After being asked to take a third photograph, the user may be led to a screen to snap a photo 220. If the user chooses not to snap a third photograph, the user may be led to a screen that may ask the user to enter any additional data 222. After a user snaps a photograph 220, the user may alternately be led to the screen that asks the user if they would like to enter any additional information 222. Once a user is finished taking photographs and entering information pertaining to the photographs, the user may be led to a screen asking the user when they would like a notification process to begin 224. The application server 114 may be utilized in conjunction with the SMS server 122 in order to send messages to the user electronic device 102. These messages may be sent to the user electronic device 102 at a point in time designated by the user that is after the starting time of the event. Once the user has set up the notification process, the user may be led to a screen asking the user to confirm the notification time 226. When the user has confirmed the notification time, the setting up of the event for the "1 on 1" application may be complete and the user may be led to an end screen 228.

In embodiments, the messages may be received in a messages application or a personal safety application that may embody aspects of personal safety network 100. The message received by the electronic device 102 may require that the user perform one or more specific functions relative to the electronic device 102. These functions may include one or more of the following functions such as, but not limited to, inputting a password, triple clicking a home button on a computing device, double clicking a home button on a computing device, and replying to a text message. When the user inputs the correct function into the electronic device 102, the system application may confirm that the user is not in danger. If a user inputs the wrong function or does not provide a function, the system application may assume that the user may be in a threatening situation. The system application may then send protocol to the IVR server 118 to call a first security contact 124 of the user. If the first security contact 124 responds to the call, the first security contact 124 may receive on their electronic device information in the form of an E-mail and/or a text message including information relative to the user of the system application 108. If the first security contact 124 does not respond, the IVR server 118 may contact a second security contact 126 of the user of the system application 108.

Figure 5:
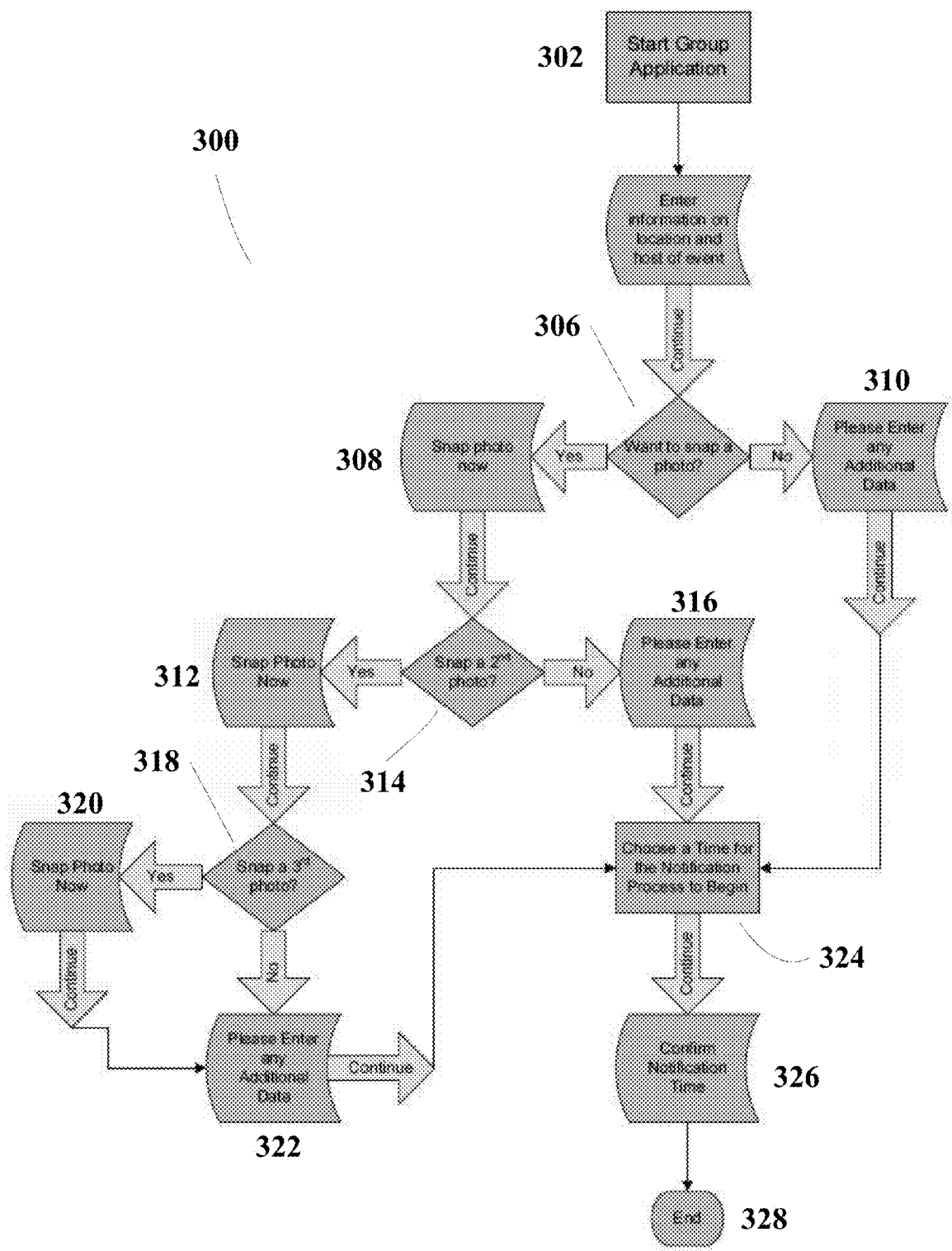
FIG. 5 displays a flow diagram for a potential series of steps/events for a group user event according to an embodiment.

FIG. 5 displays a flow diagram for a potential series of steps/events for a group user event 300 according to an embodiment. The series of steps/events (elements 302-328) may be similar to the steps/events (elements 202-228) found in the one-on-one user event 200 of FIG. 4. One difference between the two user events may be that the group user event 300 may be more tailored to a user who may eventually come in contact with more than one person (essentially, a group of people) once a user starts the group application 302. Because of the difference, the data presentation of the screens on a user electronic device 102 for the group user event 300 may differ from the one-on-one user event 200. For example, a screen displayed that requires a user to input event information may require a user to input information such as, but not limited to information on the host of an event, information on attendees of an event, etc. The user may enter as much information that is available to them so that the system application 108 may document as many aspects of the event as possible.

Figure 6:
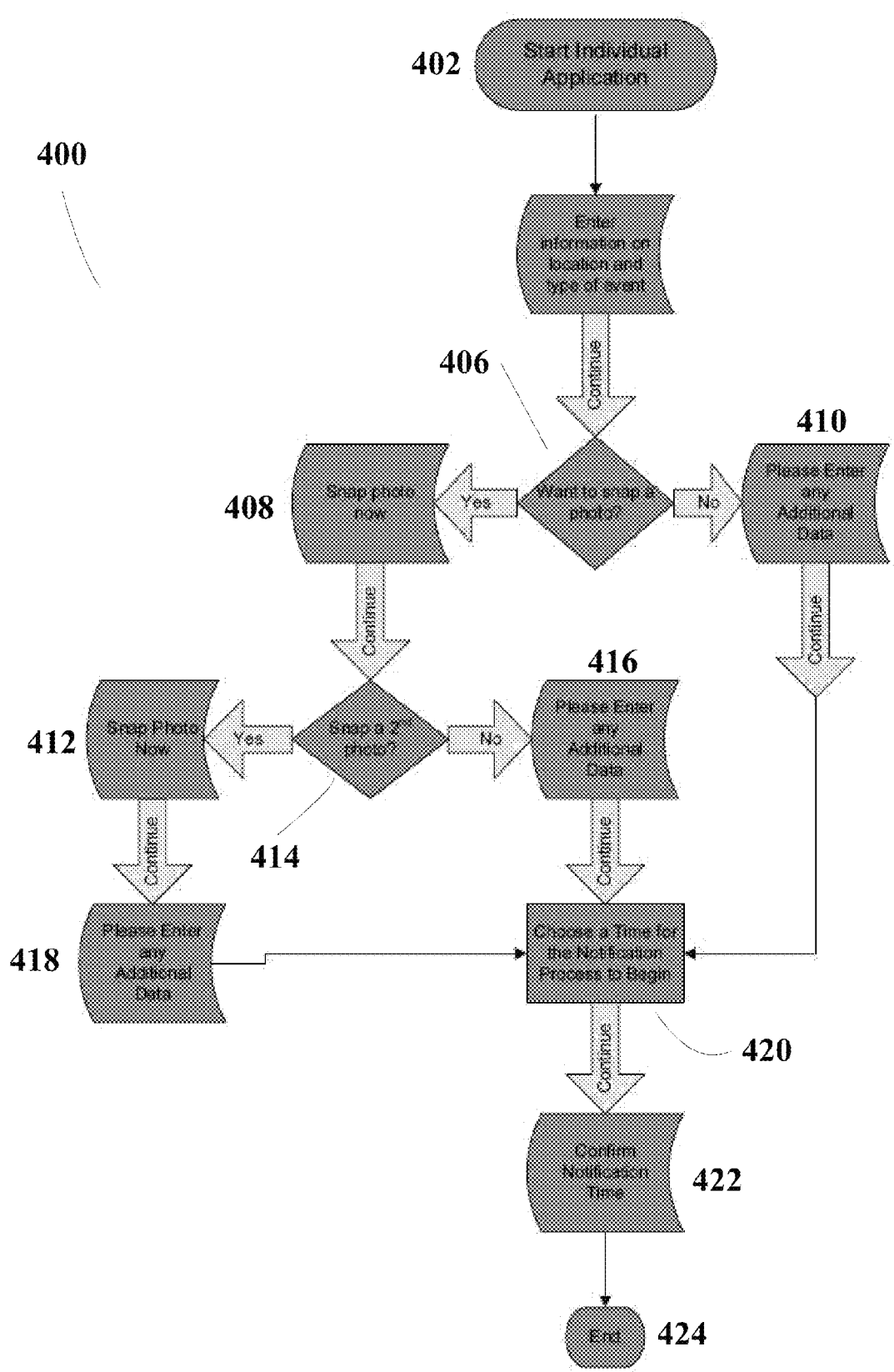
FIG. 6 displays a flow diagram for a potential series of steps/events for an individual user event according to an embodiment.

FIG. 6 displays a flow diagram for a potential series of steps/events for an individual user event 400 according to embodiments. The series of steps/events (elements 402-424) may be similar to the steps/events (elements 202-228) found in the one-on-one user event 200 of FIG. 4 aside from certain variances. The flow diagram representing the individual user event 400 may show steps/events similar to steps/events (elements 202-228) of FIG. 4 (and certain variations) less the steps/events concerning snapping a third photograph (elements 218, 220). An individual user event may be created by a user when a user may participate in an event that may potentially lead to the user encountering another individual, but not necessarily. Information may be documented similarly to previous embodiments of event creations. A user may begin entering information once the user starts the individual application 402. Examples of individual user events may include, but are not limited to running, shopping, driving a car, walking to work, and eating at a food establishment.

Figure 7:
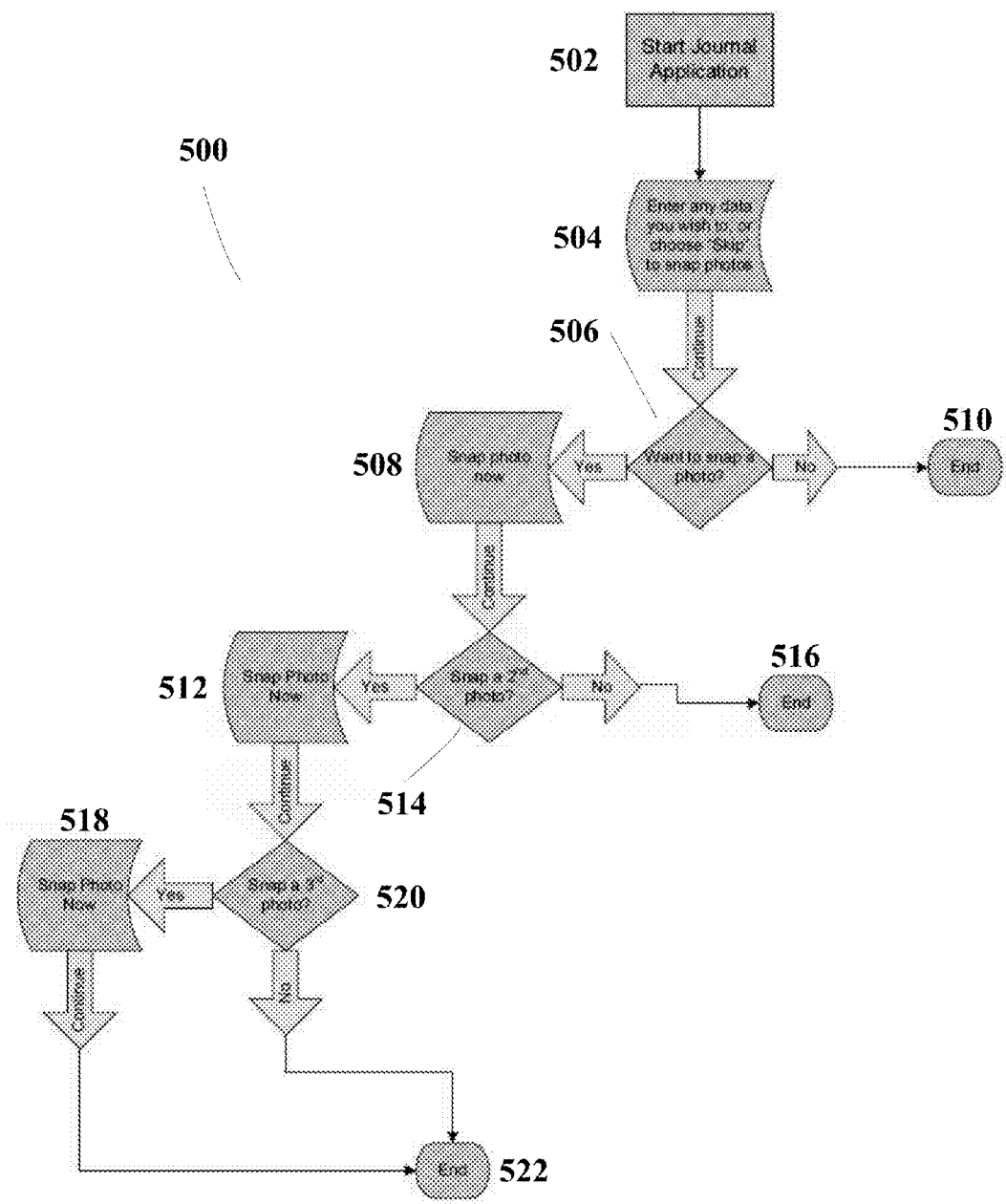
FIG. 7 displays a flow diagram for a potential series of steps/events for a user journal according to an embodiment.

FIG. 7 displays a flow diagram for a potential series of steps/events for a user journal 500 according to an embodiment. The series of steps/events (elements 502-522) may be similar to the steps/events (elements 202-228) found in the one-on-one user event 200 of FIG. 4 aside from certain variances. The flow diagram representing the user journal 500 may show steps/events similar to steps/events (elements 202-228) of FIG. 4 (and certain variations). The steps that are similar may include the steps/events of being asked to snap a photograph and snapping a photograph. If at any point a user chooses not to snap a photograph, the user may be led to an end screen (510, 516, 522). A user journal may allow a user to input information of the user's choosing into the user electronic device 102. A user may input typed data and subsequently may take photographs with the electronic device 102, both of which may automatically be stored in a database server 116. Information may be documented similarly to previous embodiments of event creations. A user may begin entering information once the user starts the individual application 502. This information may be accessed by a user on a user electronic device 102 at a later point in time.

Figure 8:
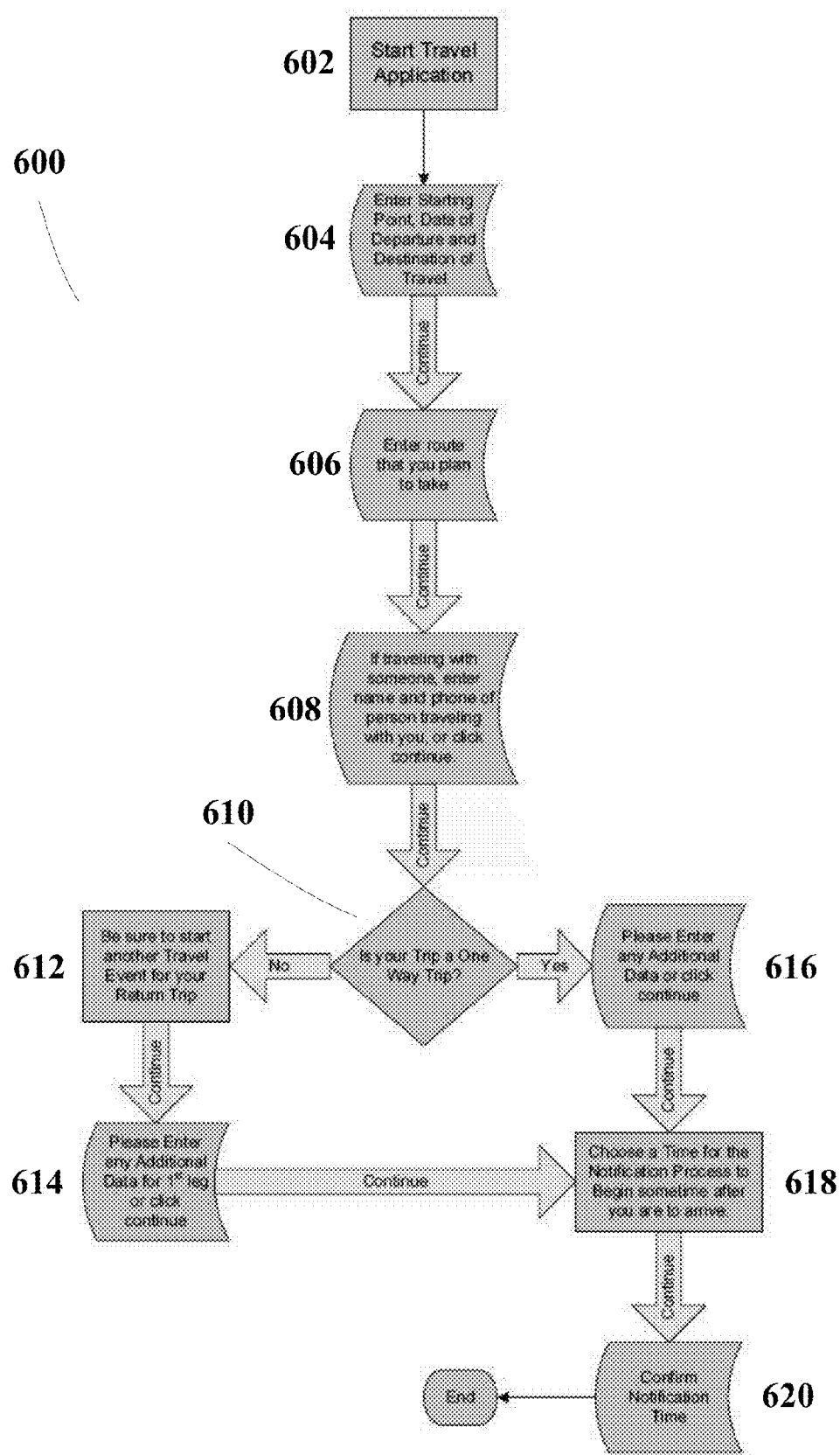
FIG. 8 displays a flow diagram for a potential series of steps/events for a user travel log according to an embodiment.

FIG. 8 displays a flow diagram for a potential series of steps/events for a user travel log 600 according to an embodiment. A user may enter information relevant to a user's travel event such as, but not limited to, a starting point of travel, a date of departure, a destination point of travel, a travel route, and one or more people who may be accompanying the user as well as the people's information 604, 606, 608. This information may be input in a single user electronic device 102 screen or separate user electronic device 102 screens once a user starts the travel application 602. The user may then be led to a screen that may ask the user whether the trip that the user is taking is one-way or not 610. If the user answers no to the posed question, the user may be alerted by the system application 108 to create another travel event for a return trip (on the same or a separate screen) 612. The user may then be led to a screen that may ask the user to enter additional information concerning the trip 614. Once a user enters additional information or does not have additional information to enter into the screen that may ask the user to enter additional information concerning the trip 614, the user may actuate a continue icon. The user may then be led to a notification time screen 618, wherein the user may choose when the application server 108 may notify the user electronic device 102. The notification sent from the notification time screen 618 may be sent by the application server 108 at a time after the user may be scheduled to arrive at the user's destination. Once a time is chosen, the user may be led to a confirm notification time screen 620, wherein the user may confirm that the time for a notification will occur at the scheduled time. Once a notification time is set up, an end screen 622 may be displayed on the user electronic device 102.

If the user answers yes on the screen with the one-way trip question 610, the user may be led to a screen that may allow a user to enter any additional data concerning the one-way trip 616. Once additional data is or is not input, the user may be led to the above mentioned notification time screen 618 and confirm notification time screen, wherein the sequence of events may be similar to the events stated in the above paragraph.

In embodiments, a user may set a time for a notification process to begin prior to an event being set up on a user's electronic device 102.

In embodiments, information sent to the one or more of the servers utilized in the personal safety network 100 may be used to do background checks on individuals that a user may come in contact with. The application server 114 and database server 116 may be programmed to access potential criminal records of individuals via a wired or wireless connection to the internet. In embodiments, the application server 114 and database server 116 may be programmed to access potential criminal records of individuals via a link to a criminal database. This information may be accessed and/or displayed via a user electronic device/computing system 102, 1.

In embodiments, typed information and/or photographs in the form of computer readable code may be stored on a system memory 4 of the user electronic device/computing system 102, 1 or on a memory of an application server 114 or database server 116. The computer readable code may be matched with computer readable code found on the internet or in a criminal database that the application server 114 or database server 116 may access via links and/or wired or wireless connections. This may allow a user to check the criminal background of an individual.

In embodiments, a user may allow GPS-tagging within the system application 108. This feature may utilize a user electronic device's GPS capabilities. An application server 114 may be set to receive a GPS location of a user electronic device 102 at least once (and preferably at set intervals). This may create more personal security for a user since the application server may track the location a user's electronic device 102.

In embodiments, contacts of a user may include, but are not limited to, a family member, a friend, a church acquaintance, a business acquaintance, a school acquaintance, and a medical acquaintance.

In embodiments, events participated in by a user may include, but are not limited to, a solo event, a one-on-one event, a group event, a social event, a family event, a business event, a recreation event, a shopping event, an exercise event, a church event, a sporting event, and a travel event.

In embodiments, a system may provide personal safety to a user. The system (such as, but not limited to computing system 1 in connection with other elements of the disclosure) may provide a network interface 38 for receiving information for contacts from a computing device (such as, but not limited to a user electronic device 102) connected to the network interface 38 over a network (such as those mentioned in the above paragraphs). In embodiments, the computing device may comprise GPS tagging capabilities. The system may further include a network interface 38 for receiving information regarding an event from a computing device connected to the network interface 38 over a network. The system may further include a network interface 38 for receiving a notification that at least one specified condition has been met for the notification to have been sent to the network interface 38 from a computing device connected to the network interface 38 over a network. In embodiments, the condition may comprise one or more tasks completed by a user. In embodiments, a task may include, but is not limited to inputting a password, triple clicking a home button on a computing device, double clicking a home button on a computing device, and replying to a text message.

The system may further include a network interface 38 for receiving event completion data from a computing device connected to the network interface 38 over a network. In embodiments, events may include, but are not limited to, one or more of a solo event, a one-on-one event, a group event, a social event, a family event, a business event, a recreation event, a shopping event, an exercise event, a church event, a sporting event, and a travel event.

The system may further include a memory of a server simultaneously storing the contact information, the event information, the notification, and the event completion data. In embodiments, the system may comprise and utilize a system memory 4 for similar storage purposes. The system may further comprise a processor for processing the received notification to determine a contact of the user to contact. In embodiments, the server may be controlled by the processor to contact at least one contact of the user.

It is noted that the network interfaces 38 mentioned may be the same network interface 38 in each instance or may be more than one network interface 38. It is further noted that the computing devices mentioned may be the same computing device in each instance or may be more than one computing device.

In embodiments, the computing device may be capable of matching computer readable code stored on a memory of the server with computer readable code in a memory of a criminal database via an application server 108.

In embodiments, the system may further comprise a network interface 38 for receiving more than one GPS tag correlating to a location of the computing device. This may essentially be used to find a user of the personal safety network 100 when they are assumed to be in an undesirable situation.

In embodiments, the term "simultaneously" may refer to the contact information, the event information, the notification, and the event completion data being stored in the memory of the server at a time that a computing system 1 is able to capably store the data.

In embodiments, the system (and other variations) mentioned in the previous paragraphs may be utilized in a method for providing personal safety to a user. The method may include receiving at a network interface 38 information for contacts from a computing device (such as, but not limited to a user electronic device 102) connected to the network interface 38 over a network (such as those mentioned previously). In embodiments, the computing device may comprise GPS tagging capabilities. The method may further comprise receiving at a network interface 38 information regarding an event from a computing device connected to the network interface over a network.

The method may further comprise simultaneously storing at a memory of a server the information for contacts and the information regarding the event. The method may further comprise receiving at a network interface 38 a notification that at least one specified condition has been met for the notification to have been sent to the network interface 38 from a computing device connected to the network interface 38 over a network. In embodiments, the condition may comprise one or more tasks completed by a user. In embodiments, a task may include, but is not limited to inputting a password, triple clicking a home button on a computing device, double clicking a home button on a computing device, and replying to a text message.

The method may further comprise receiving at a network interface event completion data from a computing device connected to the network interface over a network. In embodiments, events may include, but are not limited to, one or more of a solo event, a one-on-one event, a group event, a social event, a family event, a business event, a recreation event, a shopping event, an exercise event, a church event, a sporting event, and a travel event.

The method may further include processing the received notification using a processor to determine a contact of the user to contact. In embodiments, based on the notification that specified conditions have been met, contacting at least one contact of the user by way of the server controlled by the processor.

It is noted that the network interfaces 38 mentioned may be the same network interface 38 in each instance or may be more than one network interface 38. It is further noted that the computing devices mentioned may be the same computing device in each instance or may be more than one computing device.

In embodiments, the computing device may be capable of matching computer readable code stored on a memory of the server with computer readable code in a memory of a criminal database via an application server 108.

In embodiments, the system may further comprise a network interface 38 for receiving more than one GPS tag correlating to a location of the computing device. This may essentially be used to find a user of the personal safety network 100 when they are assumed to be in an undesirable situation.

For the purposes of this disclosure, it is noted that in all embodiments of the current disclosure, at least some of the information put into a user electronic device 102 may be automatically and simultaneously backed up to one or more servers when the information is input into the user electronic device 102. This function may act as a safety precaution so that evidence of an event may not be lost due to tampering, etc. with a user electronic device 102.

For the purposes of this disclosure, the terms "performing a function" and "satisfying a condition" may be synonymous.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A method for providing personal safety communications for a user, comprising:
   receiving at a network interface information for contacts from a computing device connected to the network interface over a network, the computing device comprising GPS tagging capabilities;
   receiving at the network interface information regarding an event from the computing device connected to the network interface over the network;
   simultaneously storing at a memory of a server the information for contacts and the information regarding the event;
   receiving at the network interface a notification that at least one specified condition has been met for the notification to have been sent to the network interface from the computing device connected to the network interface over the network;
   receiving at the network interface event completion data from the computing device connected to the network interface over the network;
   processing the received notification using a processor to determine a contact of the user to contact; and
   based on the notification that at least one specified condition has been met, the at least one specified condition comprising at least one task completion by the user of the at least one task, contacting at least one contact of the user
   wherein the one or more tasks include one or more of inputting a password, triple clicking a home button on a computing device, double clicking a home button on the computing device, and replying to a text message.

2. The method of claim 1, the computing device capable of matching computer readable code stored on the memory of the server with computer readable code in a memory of a criminal database via an application server.

3. The method of claim 1, the contacts including one or more of a family member, a friend, a church acquaintance, a business acquaintance, a school acquaintance, and a medical acquaintance.

4. The method of claim 1, the event including one or more of a solo event, a one-on-one event, a group event, a social event, a family event, a business event, a recreation event, a shopping event, an exercise event, a church event, a sporting event, and a travel event.

5. The method of claim 1, further comprising receiving at timed intervals at the network interface, more than one GPS tag correlating to a location of the computing device.

6. A system for providing personal safety communications for a user, comprising:
   a network interface for receiving information for contacts from a computing device connected to the network interface over a network, the computing device comprising GPS tagging capabilities;
   the network interface for receiving information regarding an event from the computing device connected to the network interface over the network;
   the network interface for receiving a notification that at least one specified condition has been met for the notification to have been sent to the network interface from the computing device connected to the network interface over the network, the at least one specified condition comprising at least one task completion by the user of the at least one task;
   the network interface for receiving event completion data from the computing device connected to the network interface over the network;
   a memory of a server simultaneously storing the contact information, the event information, the notification, and the event completion data;
   a processor for processing the received notification to determine a contact of the user to contact;
   wherein the server is controlled by the processor to contact at least one contact of the user
   further wherein the one or more tasks include one or more of inputting a password, triple clicking a home button on a computing device, double clicking a home button on a computing device, and replying to a text message.

7. The system of claim 6, the computing device capable of matching computer readable code stored on the memory of the server with computer readable code in a memory of a criminal database via an application server.

8. The system of claim 6, the contacts including one or more of a family member, a friend, a church acquaintance, a business acquaintance, a school acquaintance, and a medical acquaintance.

9. The system of claim 6, the event including one or more of a solo event, a one-on-one event, a group event, a social event, a family event, a business event, a recreation event, a shopping event, an exercise event, a church event, a sporting event, and a travel event.

10. The system of claim 6, further comprising the network interface for receiving more than one GPS tag correlating to a location of the computing device.

* * * * *